United States Patent [19]

Manninen et al.

[11] Patent Number: 4,685,054
[45] Date of Patent: Aug. 4, 1987

[54] METHOD AND APPARATUS FOR OUTLINING THE ENVIRONMENT OF A MULTIARTICULAR DUTY MACHINE BY MEANS OF A LASER POINTER

[75] Inventors: Markku Manninen, Haukipudas; Aarne Halme, Oulu, both of Finland

[73] Assignee: Valtion Teknillinen Tutkimuskeskus, Finland

[21] Appl. No.: 711,501

[22] PCT Filed: Jun. 29, 1984

[86] PCT No.: PCT/FI84/00050
§ 371 Date: Feb. 28, 1985
§ 102(e) Date: Feb. 28, 1985

[87] PCT Pub. No.: WO85/00316
PCT Pub. Date: Jan. 31, 1985

[30] Foreign Application Priority Data
Jun. 30, 1983 [FI] Finland .................................. 832399

[51] Int. Cl.$^4$ .............................................. G06F 15/46
[52] U.S. Cl. .................................. 364/191; 250/203 R; 364/513; 364/559; 364/189; 901/47
[58] Field of Search ............... 364/513, 478, 479, 559, 364/191–193, 188, 189; 901/9, 46, 47; 250/203 R, 203 CT, 104; 358/105, 107, 125, 126, 903; 414/730

[56] References Cited

U.S. PATENT DOCUMENTS

| | | | |
|---|---|---|---|
| 4,044,377 | 8/1977 | Bowerman | 358/107 |
| 4,146,924 | 3/1979 | Birk et al. | 364/559 X |
| 4,187,051 | 2/1980 | Kirsch et al. | 364/478 X |
| 4,219,847 | 8/1980 | Pinkney et al. | 358/105 X |
| 4,280,135 | 7/1981 | Schlossberg | 358/93 |
| 4,396,945 | 8/1983 | Dimatteo et al. | 358/107 |
| 4,453,085 | 6/1984 | Pryor | 250/561 X |
| 4,523,100 | 6/1985 | Payne | 250/561 |

Primary Examiner—Joseph Ruggiero
Attorney, Agent, or Firm—McGlew and Tuttle

[57] ABSTRACT

A method and apparatus for outlining the manipulation environment of a duty machine automatically determines its working cycles. The method includes a laser pointer (2) which measures the direction and distance of the laser beam with respect to an object. By means of the pointer there is registered a set of points (1), which can be formed of separate pointes or of continuous lines and which gives a rough illustration of the entire manipulation space, i.e. its free space and the objects located therein. The set of points is completed to form a model of the manipulation environment both by means of geometric plane figures (primitive volumes)(3) sent from the user's keyboard, and by means of mathematical algorithms, in order to match the spatial planes and curves with the given set of points. The automatically determined trajectories are corrected during the working performance according to the feedback information received from the object under operation.

12 Claims, 6 Drawing Figures

METHOD AND APPARATUS FOR OUTLINING THE ENVIRONMENT OF A MULTIARTICULAR DUTY MACHINE BY MEANS OF A LASER POINTER

FIELD AND BACKGROUND OF THE INVENTION

The present invention relates to a method and apparatus for outlining the manipulation environment of a multiarticular duty machine, such as a hoist and transmitter, an excavator, a forest harvester or a rock drill, by means of a laser pointer in order to determine the trajectories automatically and to control the machine. The invention can also be applied for teaching an industrial robot its working cycle.

At present a multiarticular duty machine, for instance a hydraulic jack, an excavator or a drilling arm assembly are controlled articulation by articulation so that the user, while controlling the various articulations, simultaneously also controls the movements of the arm head. While the total number of controlled articulations can rise up to seven, the arm control may become troublesome. The most developed manipulator arrangements have utilized a computer system for coordinating the movements so that the user may directly control the arm head by the control stick, and the computer calculates the control of each separate articulation and guides the arm control so that the arm head moves along a straight path to the direction ordered by the user. The user can also program the automatic cycles of the computer by means of the control stick and the keyboard. The said control method is generally known in the prior art, but the applications for controlling arm machines have been limited.

SUMMARY OF THE INVENTION

The purpose of the invented method is to release the user almost totally from controlling the arm and from teaching the automatic movements by handling the arm, so that he has his hands free for task description and for general control of operations. Before a certain work performance, the user registers the manipulation environment by means of a suitable device (laser pointer) into the control unit, and on the grounds of this simple registration the control unit determines the working cycles in order to perform the task. Thus the remaining duties of the user are to supervise the work performance and to correct trajectories if necessary. The invented method brings forth a completely new way of controlling duty machines provided with arms. The method is characterized by the novel features enlisted in the patent claims.

Another object of the invention is an apparatus for realizing the method. The system components include a laser spot pointer and a menu-type user keyboard, by means of which equipment the manipulation environment is registered. The system components as such do not form the object of the invention, because their operation is generally known in the prior art. The main inventive concept is the new way of combining old principles. The apparatus developed for applying the new method is characterized by the novel features enlisted in the patent claims.

The method of the present invention can also be applied in the teaching of industrial robots and manipulators, which is known to be a difficult and time-consuming operation. Robots of the first generation are taught so that the robot is once carried through the whole cycle, whereafter this cycle is stored in the memory so that it can later be repeated from the memory. The second generation robots are taught in the control language. This method of teaching is troublesome, too, because the user must define the cycle and the manipulated objects is an ordinary computer language. The method and apparatus of the present invention, combined to the teaching language, renders a teaching method which in many practical applications is suited for industrial robots much better than the currently used methods.

The present invention aims at developing a simple method and system for registering the environment of multiarticular duty machines provided with arm assemblies—such as hoist and transmitter equipment, excavators, forest harvesters and rock drills in order to define the working cycles automatically. Thus the principal purpose of the invention is to improve the degree of automatization in such duty machines that are provided with arms and are operated in difficult environmental circumstances. The invented method and system of registration can also be applied in teaching industrial robots, in which case the invented method and system can be used to speed up the teaching process.

The main principle of the invention is that the user analyzes and outlines the manipulation environment, whereafter he, as a result of this analysis, produces a point model of the manipulation environment. This point model approximates the working space in a very rough fashion. Each point of the point model represents a certain feature point in the real space. This point model is completed in two ways: by feeding in geometric plane figures, so called primitive volumes, from the menu-type user terminal, and by completing a certain partial area in the point model by mathematical algorithms, so that a convex mask for example is calculated for a given set of points. As a result of this completion process, the model describing the manipulation space is recorded in the computer memory in a form which is sufficiently accurate for the determination of the trajectories. On the basis of the produced model it is possible to define the working cycles and to calculate the trajectories for performing the cycles. While defining the cycles, the user may complete the model by pointing out for instance the points of grip of shiftable objects, as well as their terminal station.

The present invention also relates to an apparatus for applying the method. The system includes the following components: a laser pointer, a menu-type user keyboard, a calculation unit and an arm control unit. By means of the laser pointer the user points out such objects in the real environment as are represented in the point model. The menu-type keyboard is used for completing the model by giving the geometric plane figures. The calculation unit carries out all mathematical calculations required for producing the final model and for determining the trajectories. The arm control unit performs the control operations according to the predetermined path.

The basic component is the laser spot pointer, which points out the objects in the manipulation environment. The laser pointer measures the direction of the laser beam by means of two position sensors; it also measures the distance on the basis of the light pulse received from the objects in the manipulation environment—without employing a reflective prism. Another important component is the intelligent menu-type keyboard of the user.

BRIEF DESCRIPTION OF THE DRAWINGS

In the following the invention is described in the light of detailed examples and with reference to the appended drawings, where.

DESCRIPTION OF THE PREFERRED EMBODIMENTS

Figure 1:
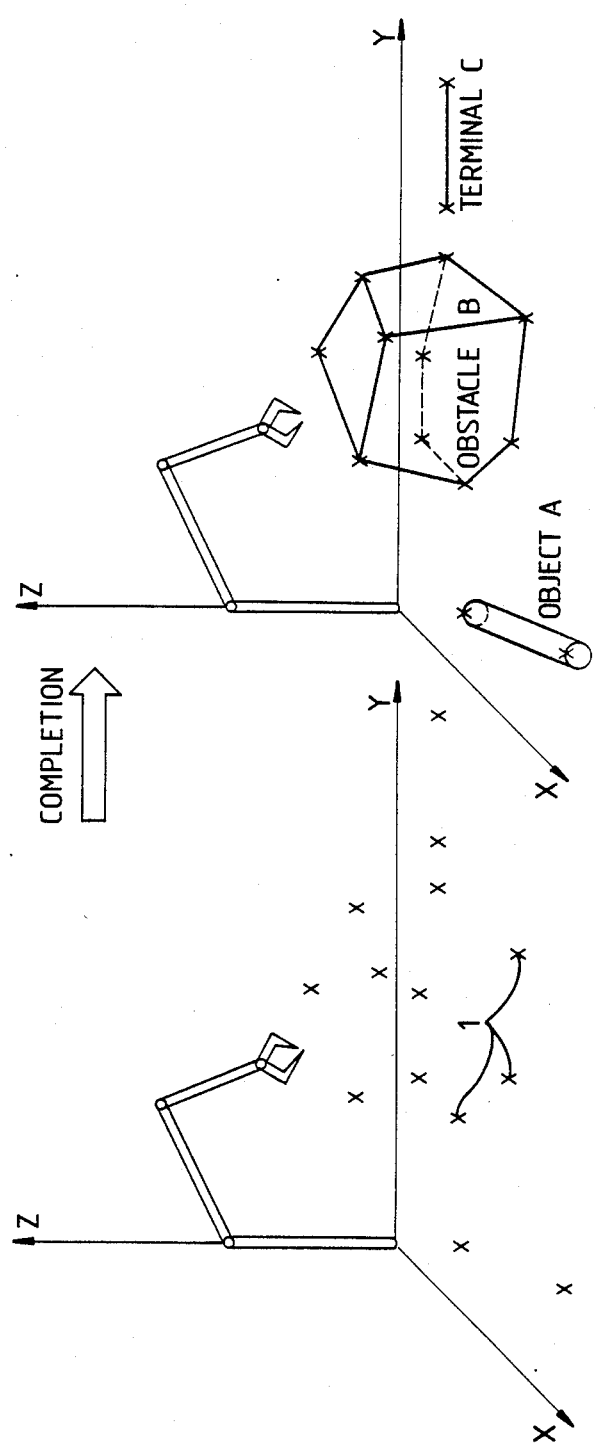
FIG. 1 illustrates the environment registration system.

The basic transaction in the invented method is first to create a point model which described the manipulation environment of a multiarticular duty machine in a sufficiently accurate way. FIG. 1 shows the set of points 1 located in the base coordinates of the arm, the said set of points representing the point model. According to the method of the invention, the point model is completed either by means of geometric primitive volumes given by the user—such primitive volumes are basic figures drawn on a plane, such as a circle, a rectangle and a straight line—and/or by means of mathematical algorithms. FIG. 1 also shows a completed version of the earlier point model. The object (A) is now completed as a cylinder on the basis of its diameter and the form given by user. This description may represent for instance a log. The obstacle (B) is completed according to a mathematical algorithm. The algorithm can be for example a generally known algorithm descending into the given set of points in the convex mask. The terminal station (C) is completed with a straight line which defines the position of the shiftable object in the terminal station. The completed model contains an adequate amount of information for determining the arm trajectories. In addition to this, the user may complete the model in order to calculate the trajectories by determining point of grip in the shiftable object as well as by defining how the obstacle should be avoided.

The following specification gives a detailed description of one preferred embodiment of the system of the invention. It is to be noted that the practical applications of the present invention can be largely modified within the scope of the patent claims.

Figure 2:
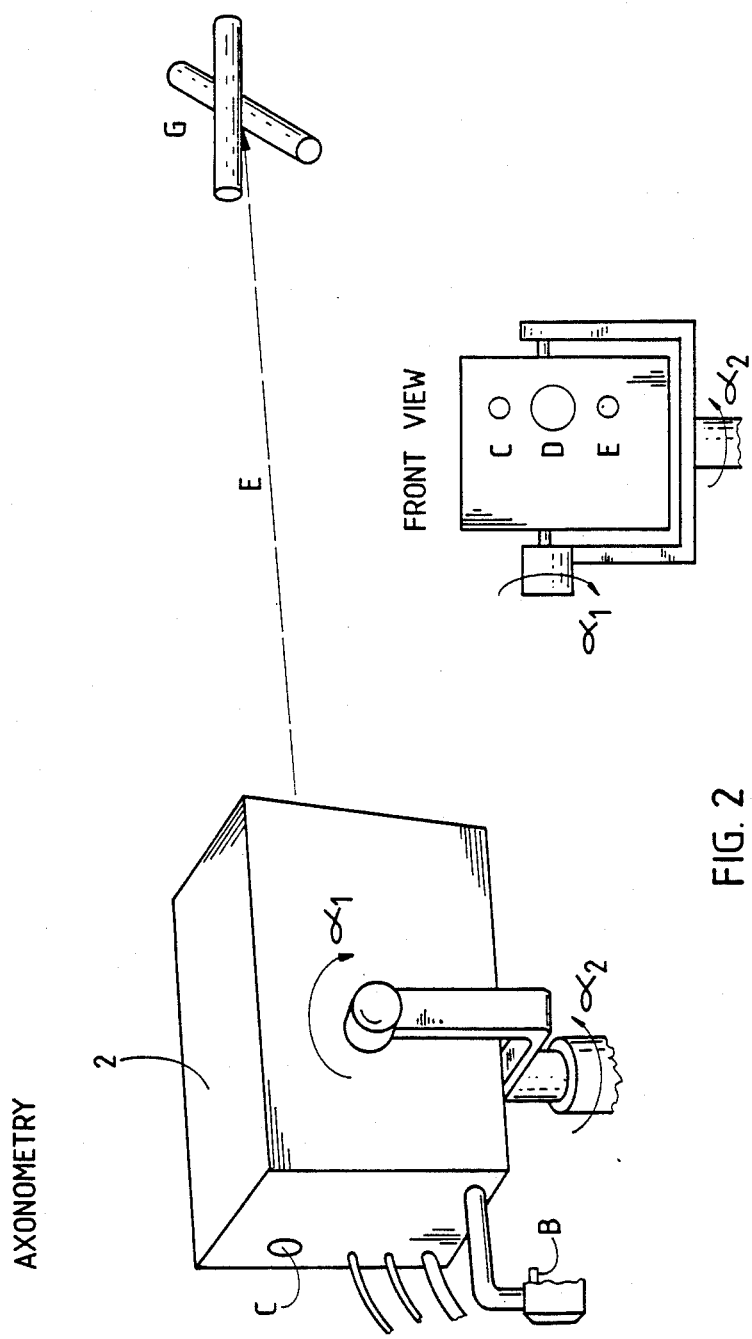
FIG. 2 illustrates a preferred embodiment of the laser pointer.
Figure 3:
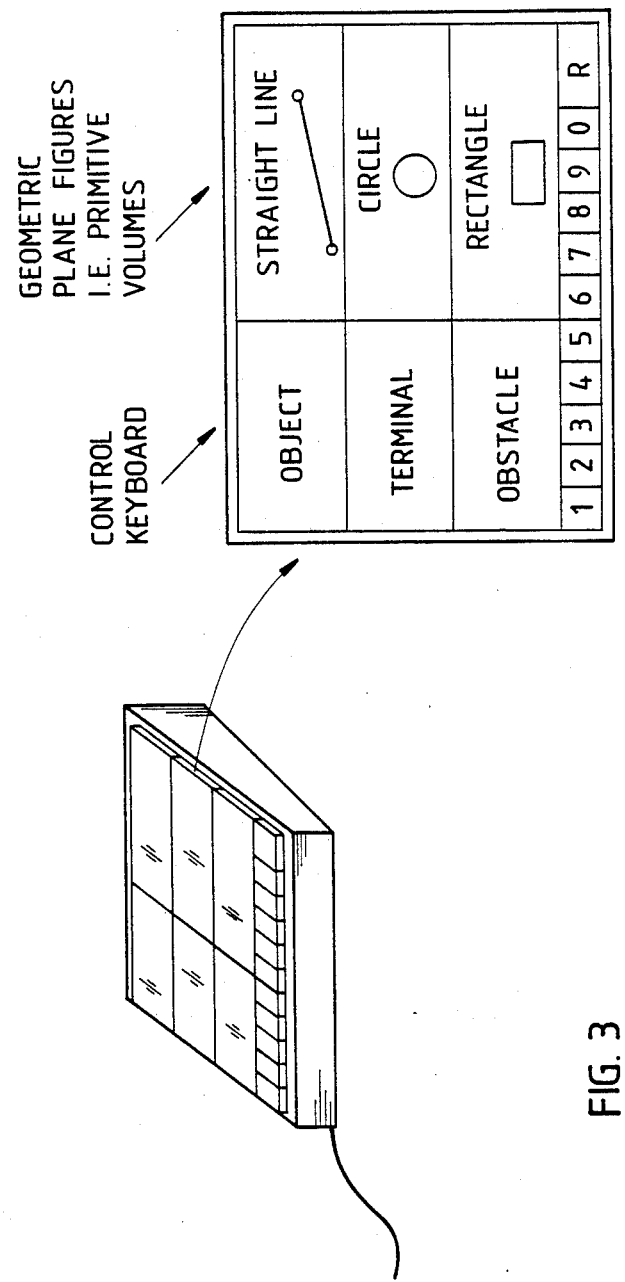
FIG. 3 illustrates a preferred embodiment of the intelligent menu-type keyboard of the user.

The basic component of the invented teaching method is the laser rangefinder, which is illustrated in FIG. 2. The rangefinder serves as a pointer which can be directed towards a desired object in the manipulation space of the arm assembly by mens of two ball pivots (2, $\alpha_1$ and $\alpha_2$). The focusing is carried out by means of the viewfinder (2, C). After focusing the device to a desired object, the user records the coordinates of the object by pressing the press key (2, B) so that the position readings of the rangefinder ($\alpha_1$ and $\alpha_2$) and the distance information are stored in the memory. The rangefinder is constructed so that it measures the transit time of the light pulse transmitted by the pulsated semiconductor laser from the transmitter (2, E) towards the object (2, G) and back to the receiver (2, E). A sufficient accuracy and resolution is achieved by averaging the measuring results. Because the pulse frequency may be high (10 kHz), a distance reading is received (after averaging) at each 10 ms, which is a sufficient measuring rate. The radiation power of the semiconductor laser is collimated in the transmitter lenses so that the beam width is as small as possible ($=1$ cm$^2$ on the surface of the object at the distance of 10 m). Another essential component of the invention is the menu-type keyboard, which the user can employ for sending geometric primitive volumes to the calculation unit and for giving information of the object that the laser is pointing. FIG. 3 shows an example of the menu-keyboards.

Figure 4:
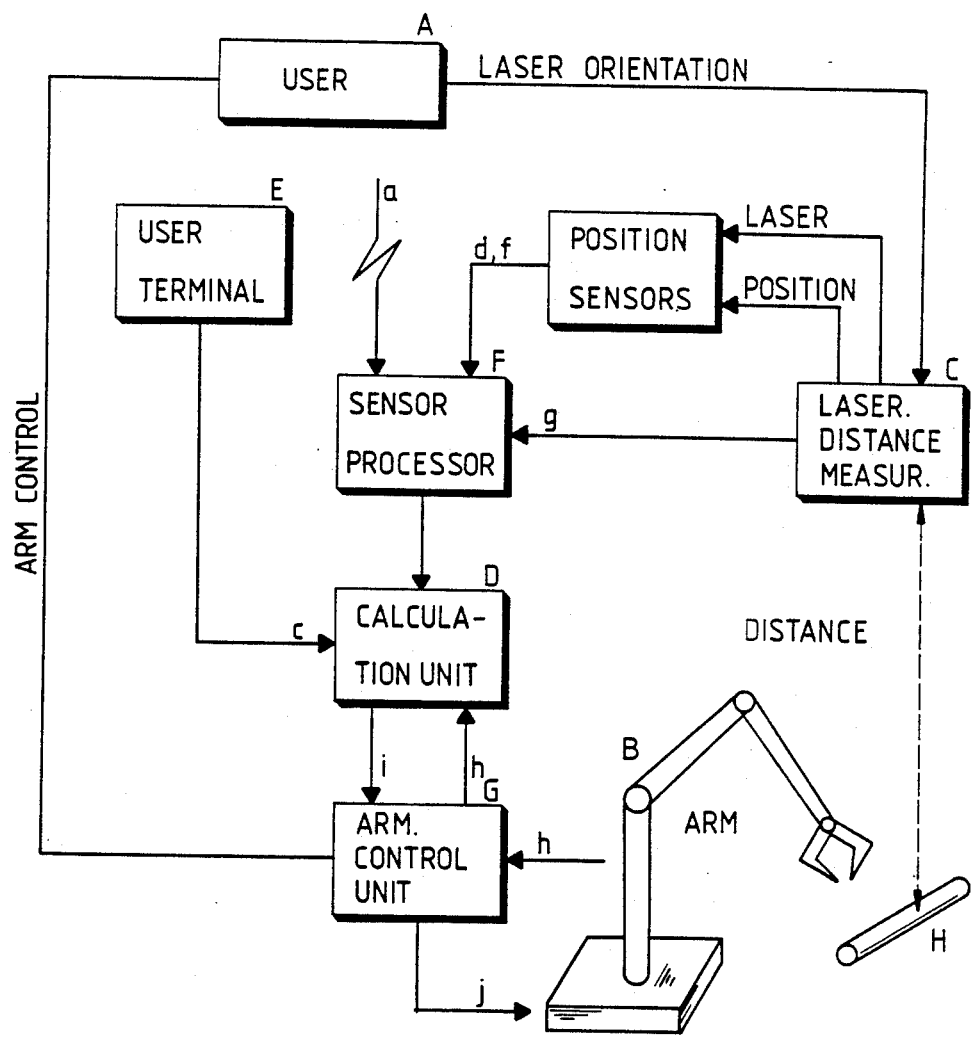
FIG. 4 is a schematic diagram of an application of the method.

FIG. 4 is a schematic diagram of the system of the invention. The user (4, A) of the arm machine (4, B) directs the laser printer (4, C) towards the object (4, H) situated in the manipulation environment and sends a command message (4, c) from the terminal device (4, e) to the calculation unit (4, D), whereafter he presses the press key of the laser pointer which sends a reading command (4 a) to the sensor unit (4, F). After receiving the reading command, the sensor unit reads the laser pointer position information (4, d and f) on the position sensor, and the distance information (4, g) on the rangefinder. The sensor unit records the information in its memory until the calculation unit inquires them. The arm control unit (4, G) sends the arm position information (h) regularly to the calculation unit, and inquires, when necessary, the determined trajectory (i) in order to calculate respective control advice for each articulation and in order to realize a guided path (j) according to the given trajectory.

Figure 5:
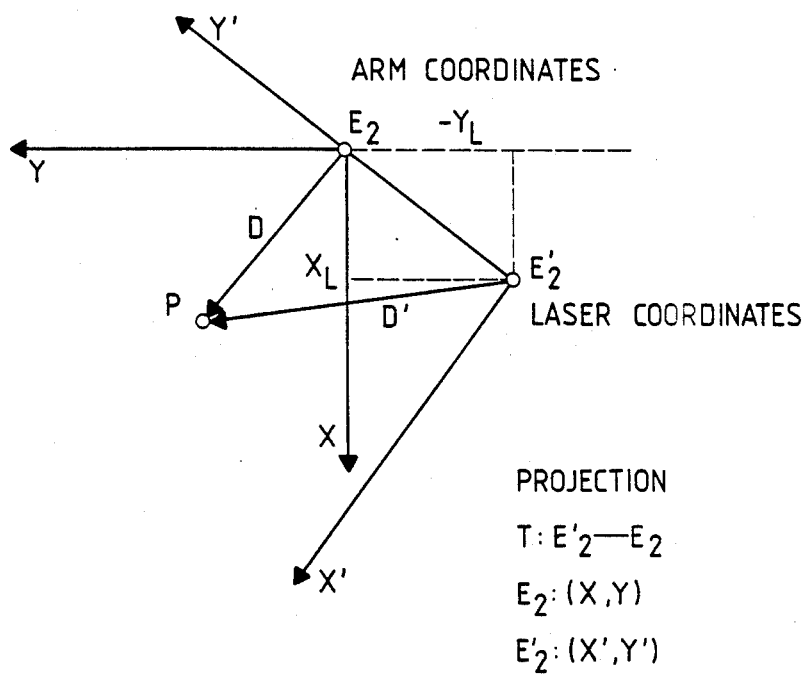
FIG. 5 illustrates how the positions of the points pointed out by the laser pointer are calculated in the base coordinates on the arm assembly.

FIG. 5 shows an example of how the coordinates of the object pointed out by means of the laser are calculated in the arm coordinate system. To give an example, let the arm and the laser device be located on the same level. The laser rangefinder is situated in the arm coordinates $E_2$ at the point ($x_L$, $y_L$; vector $R_L$).

The projection of the distance vector, measured by the rangefinder, on the plane $E_2'$ is $D'$, which can be calculated in normal fashion on the basis of distance information and the readings of the position sensor ($\alpha 1$, $\alpha 2$), which define the position of the rangefinder. The location in the arm coordinate system of the object P pointed out by the laser is defined by the vector D, i.e. $D = D + R_L$. If the arm and laser rangefinder are not situated on the same level, the location of a point in the laser coordinate system can be calculated according to the same principle in the arm coordinate system. Thus, according to the principle explained above, the location of each point pointed out by the laser can be determined in the Cartesian coordinates $E^3$ placed at the base of the arm. Each point in $E^3$ can be described in the arm articulation coordinate system $N^n$ by following the generally known principles of robotics (n refers to the number of free instances, i.e. the number of articulations). Thus each point pointed out by the laser can be presented in the articulation coordinate $N^n$ of the arm.

Figure 6:
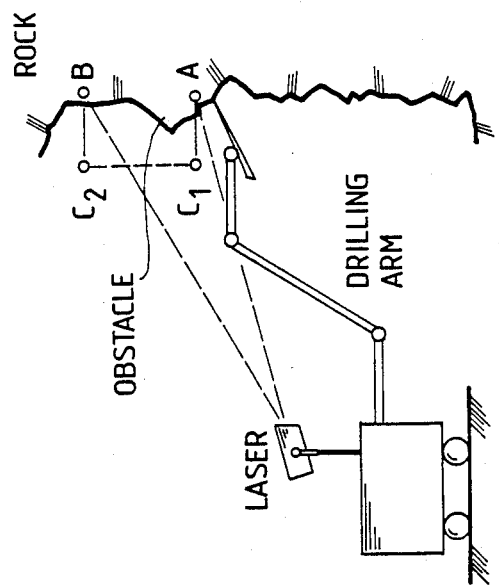
FIG. 6 illustrates two exemplary cases for determining the trajectories.
Figure 6:
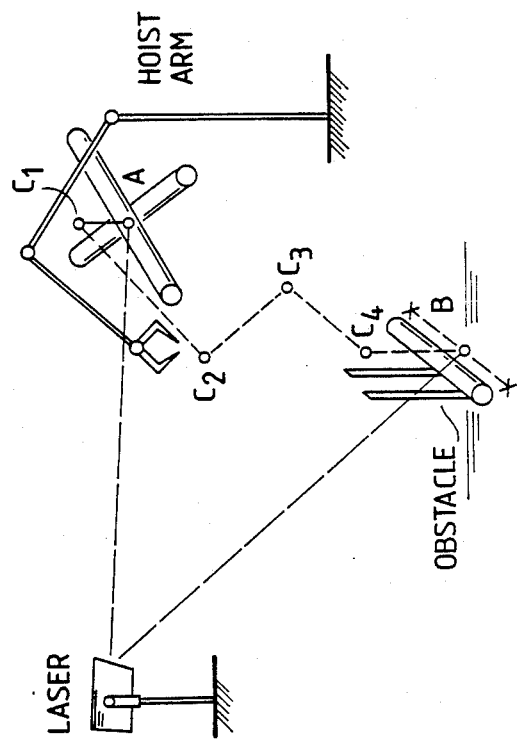

The following description shows, in the light of two examples, how the trajectories for the cycles are produced after outlining the working space. The starting point is a completed point model of the manipulation environment. FIG. 6 shows two simplified diagrams, the first about transmitting objects and the second about drilling rock. The trajectories are determined so that the user points out the starting point (6, A) of the path—this can be for instance the point of grip of the shiftable object—and the terminal point (6, B). Thereafter the system can automatically produce a necessary amount of intermediate points (6, $C_1$, $C_2$) in order to determine the trajectory in more detail; these intermediate points are calculated on the basis of the completed point model so that the trajectory does not collide with the obstacles situated in the manipulation environment. From his terminal device, the user gives the speed and acceleration information for the separate parts of the path. By combining the path points with a straight line, he gets the final trajectory which the arm head should follow in order to realize the planned cycle. When the straight-line trajectory in the articular base coordinate system is known, the set points between each two articulations can be determined as a function of the trajectory according to generally known principles.

The above specification, illustrations and examples describing the invention are meant only to throw light onto the operation of the method and apparatus of the invention. A wide range of variation in the practical applications of the invention is possible without deviating from the appended patent claims.

We claim:

1. A method for outlining features in the manipulation environment of a duty machine comprising: pointing the laser beam of a laser pointer in succession at a plurality of points on features of the environment, the laser pointer being movable to different positions for directing the laser beam at different directions to the plurality of points, the plurality of points being at different distances from the laser pointer; measuring the direction of the laser beam for each point; measuring the distance of the laser pointer to each point; storing the measured directions and distances for each point in a memory, the stored directions and distances forming position information for each of the points; selecting one of a plurality of geometric plane figures representing primitive volumes, using a keyboard; providing a plurality of mathematical algorithms which are useful in producing model spatial planes and curves using some of the plurality of points; and applying the geometric plane figures and the mathematical algorithms to the position information of the plurality of points to form a model of the manipulation environment including its features.

2. A method according to claim 1 wherein the features of the manipulation environment include at least one object to be moved, at least one obstacle to be avoided and at least one terminal location, said method including pointing the beam at at least one point on the object, at a plurality of points on the obstacle and at least one point at the terminal location, the duty machine having an articulation member movable to a plurality of trajectory points in the manipulation environment between the object and the terminal location, the object to be moved to each of the trajectory points to move the object to the terminal location, the method including pointing the laser beam at the object at each of the trajectory points, measuring the direction and distance for the beam at each of the trajectory points, and storing the measured direction and distance of the beam for the trajectory points in a memory to use for moving the articulation member to the trajectory points.

3. A method according to claim 1 including mounting the laser pointer to be pivotable about two mutually orthogonal axes for changing the direction of the beam, and measuring the angular position of the pointer about each of the axes for measuring the direction of the beam for each point.

4. A method according to claim 3 including using a viewfinder to focus the beam on the points and using the focus position of the viewfinder to measure the distance of each point to the laser pointer.

5. A method according to claim 3 including measuring the transit time of the laser beam from the pointer to each point and back to the pointer for measuring the distance of each point from the pointer.

6. A method according to claim 1 including manually moving the laser pointer for pointing the beam at each point and manually entering the measured direction and measured distance of the beam for each point using a switch.

7. An apparatus for outlining features in the manipulation environment of a duty machine by forming a point model of the features, comprising: a laser pointer for pointing a laser beam at a succession of points on the features of the manipulation environment; direction changing means carrying the laser pointer for moving the beam to a plurality of directions each for a separate point; distance measuring means operatively connected to said laser pointer for measuring the distance between the laser pointer and each point in a direction along the beam;

memory means operatively connected to said direction changing means and said distance measuring means for storing direction and distance information for each of the points; a menu-type keyboard for containing a plurality of geometric plane figures each of which are selectable by a user; a calculation unit operatively connected to said keyboard and to said memory and containing mathematical algorithms, said calculator unit calculating the positions of the points and producing the point model using at least some of the geometric plane figures from the keyboard and the mathematical algorithms.

8. An apparatus according to claim 7 wherein said direction changing means includes a portion sensor for sensing the position of the laser pointer and for supplying signals to said memory.

9. An apparatus according to claim 7 wherein said distance measuring means comprises a range finder in said laser pointer which is settable to focus the beam on each point, the setting of said range finder for each point corresponding to the distance of the laser pointer to that point.

10. An apparatus according to claim 7 wherein said distance measuring means comprises means for measuring a transit time of the light beam from the pointer to each point and back to the pointer.

11. An apparatus according to claim 7 wherein the duty maching includes an articulating arm and an arm control unit for moving the articulating arm, said arm control unit being connected to said calculation unit for receiving signals for moving the arm.

12. An apparatus according to claim 11 including arm position means for generating signals corresponding to the position of the arm, connected to said arm control unit for use in conjunction with signals from said calculation unit to move said arm.

* * * * *